(12) United States Patent  
Katou et al.

(10) Patent No.: US 12,217,324 B2
(45) Date of Patent: *Feb. 4, 2025

(54) DELIVERY SUPPORT APPARATUS, DELIVERY SUPPORT METHOD, AND COMPUTER-READABLE RECORDING MEDIUM

(71) Applicant: NEC Corporation, Tokyo (JP)

(72) Inventors: Takehito Katou, Tokyo (JP); Akira Kamei, Tokyo (JP); Masato Kitada, Tokyo (JP); Miki Otani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,241

(22) Filed: Nov. 27, 2023

(65) Prior Publication Data

US 2024/0087074 A1 Mar. 14, 2024

Related U.S. Application Data

(63) Continuation of application No. 17/911,743, filed as application No. PCT/JP2020/014457 on Mar. 30, 2020, now Pat. No. 11,995,735.

(51) Int. Cl.
*G06Q 50/40* (2024.01)
*G06Q 10/08* (2024.01)
*G06V 40/16* (2022.01)

(52) U.S. Cl.
CPC ............. *G06Q 50/40* (2024.01); *G06Q 10/08* (2013.01); *G06V 40/172* (2022.01)

(58) Field of Classification Search
CPC ....... G06Q 50/30; G06Q 50/28; G06V 40/172

USPC ............................................................ 705/5
See application file for complete search history.

(56) References Cited

U.S. PATENT DOCUMENTS

| 2018/0204030 A1* | 7/2018 | Bruce .............. G06K 19/07758 |
| 2019/0236520 A1 | 8/2019 | Kaneko et al. |
| 2020/0394746 A1 | 12/2020 | Krishnamurthy .... G06Q 10/083 |

FOREIGN PATENT DOCUMENTS

| JP | 2017-021451 A | 1/2017 |
| JP | 2019-105939 A | 6/2019 |
| JP | 2019-131360 A | 8/2019 |
| JP | 2019-160350 A | 9/2019 |
| WO | 2005/055151 A1 | 6/2005 |

OTHER PUBLICATIONS

"Optimal Delivery of Baggage to Passengers at Airports" Published by International Research Journal of Engineering and Technology (Year: 2018).*

(Continued)

*Primary Examiner* — Zeina Elchanti

(57) ABSTRACT a delivery support apparatus includes: an individual detection unit that detects a registered individual based on an image transmitted from a camera, an information specifying unit that specifies a destination of the individual, a schedule at the destination, and a baggage to be received at the destination for the individual detected by the individual detection unit, a notification unit that notifies a terminal device at the destination that the specified baggage will be received by the individual according to the specified schedule.

6 Claims, 9 Drawing Sheets

(56) References Cited

OTHER PUBLICATIONS

International Search Report for PCT Application No. PCT/JP2020/014457, mailed on Sep. 8, 2020.
English translation of Written opinion for PCT Application No. PCT/JP2020/014457, mailed on Sep. 8, 2020.
US Notice of Allowance for U.S. Appl. No. 17/911,743, mailed on Feb. 7, 2024.
Anitha M.L et al., "Optimal Delivery of Baggage to Passengers at Airports", International Research Journal of Engineering and Technology (IRJET), Jun. 2018.

* cited by examiner

DELIVERY SUPPORT APPARATUS, DELIVERY SUPPORT METHOD, AND COMPUTER-READABLE RECORDING MEDIUM

CROSS REFERENCE TO RELATED APPLICATIONS

This application is a Continuation of U.S. application Ser. No. 17/911,743 filed Sep. 15, 2022, which is a National Stage of International Application No. PCT/JP2020/014457 filed Mar. 30, 2020, the contents of all of which are incorporated herein by reference in their entirety.

TECHNICAL FIELD

The present invention relates to a delivery support apparatus and a delivery support method for supporting a staff member who deliver burgages, and further relates to a computer-readable recording medium in which a program for executing these apparatus and method is recorded.

BACKGROUND ART

Accommodation facilities, retail stores, etc. provide a delivery service that delivers a traveler's baggage to an airport, etc. used by the traveler. With such a delivery service, the traveler does not have to carry the baggage by himself/herself and can receive the baggage at the airport or the like, which is very convenient for the traveler. However, since the airport or the like is an unfamiliar place for the traveler, the traveler may not know where to receive the baggage, and such a delivery service has anxiety for the traveler.

For this reason, Patent Document 1 discloses a system that allows a traveler to receive baggage at a convenient location. Specifically, in the system disclosed in Patent Document 1, when a server apparatus receives identification information of a departure place (hotel, etc.), a destination (airport, etc.), and baggage from a terminal device of the traveler, the server sends information indicating candidates pick-up location for baggage to the traveler's terminal device based on the route from the departure place to the destination. Then, the traveler specifies a desired pick-up location from the candidates using the terminal device, and sends the specified pick-up location to the server apparatus. After that, the server apparatus notifies the delivery company of the identification information and the pick-up location, and the delivery company delivers the traveler's baggage to the pick-up location, so that the traveler can pick up the baggage at the desired pick-up location.

Further, in the system disclosed in Patent Document 1, the server apparatus detects when the traveler approaches the pick-up location and notifies the traveler's terminal that the traveler has approached the pick-up location. In this way, when the traveler uses the system disclosed in Patent Document 1, the traveler's anxiety about receiving the baggage is eliminated.
Patent Document
  Patent Document 1: JP 2019-160350A

SUMMARY OF INVENTION

Problems to be Solved by the Invention

Incidentally, even if the traveler can specify the pick-up location by the system disclosed in Patent Document 1, the number of staff members who deliver the baggage is limited. Therefore, when a large amount of baggage must be delivered, there is a problem that it takes time for the traveler to receive his/her baggage.

On the other hand, if the staff member can grasp who will pick up which baggage at what time, it will be possible to unload at an appropriate timing, and it is considered that the above problem can be solved. However, the system disclosed in Patent Document 1 has only a function of notifying the traveler that the traveler has approached the pick-up location. In this system, it is difficult to solve the above problem.

An example object of the present invention is to resolve the above problem and provide a delivery support apparatus, a delivery support method, and a computer-readable recording medium which notify a staff member in charge of delivering baggage of the timing of unloading.

Means for Solving the Problems

In order to achieve the above object, a delivery support apparatus includes:
  an individual detection unit that detects a registered individual based on an image transmitted from a camera,
  an information specifying unit that specifies a destination of the individual, a schedule at the destination, and a baggage to be received at the destination for the individual detected by the individual detection unit,
  a notification unit that notifies a terminal device at the destination that the specified baggage will be received by the individual according to the specified schedule.
In addition, in order to achieve the above-described object, a delivery support method includes:
  an individual detection step of detecting a registered individual based on an image transmitted from a camera,
  an information specifying step of specifying a destination of the individual, a schedule at the destination, and a baggage to be received at the destination for the individual detected by the individual detection step,
  a notification step of notifying a terminal device at the destination that the specified baggage will be received by the individual according to the specified schedule.
Furthermore, in order to achieve the above-described object, a computer readable recording medium according to an example aspect of the invention is a computer readable recording medium that includes recorded thereon a program, the program including instructions that cause the computer to carry out:
  detecting a registered individual based on an image transmitted from a camera,
  specifying a destination of the individual, a schedule at the destination, and a baggage to be received at the destination for the individual detected,
  notifying a terminal device at the destination that the specified baggage will be received by the individual according to the specified schedule.

Advantageous Effects of the Invention

As described above, according to the present invention, it is possible to notify a staff member in charge of delivering baggage of the timing of unloading.

EXAMPLE EXAMPLE EMBODIMENT

First Example Embodiment

Hereinafter, a delivery support apparatus, a delivery support method, and a program according to the first example embodiment will be described with reference to FIGS. 1 to 5.

[Apparatus Configuration]

Figure 1:
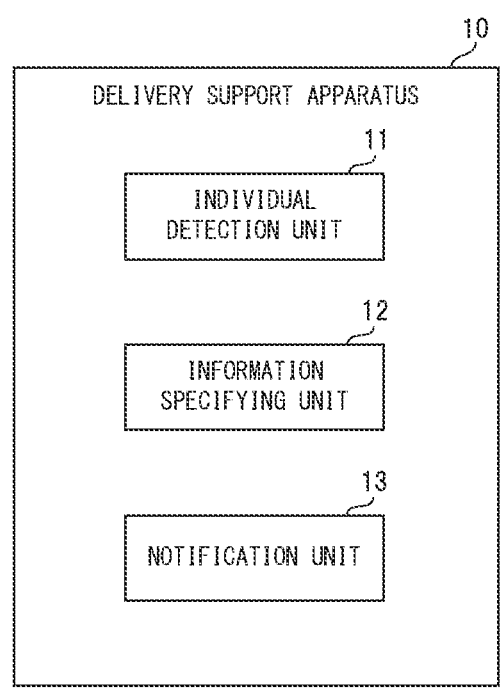
FIG. 1 is a block diagram schematically illustrating a configuration of a delivery support apparatus according to the first example embodiment.

First, a schematic configuration of the delivery support apparatus according to the first example embodiment will be described with reference to FIG. FIG. 1 is a block diagram schematically illustrating the delivery support apparatus according to the first example embodiment.

The delivery support apparatus 10 according to the example embodiment illustrated in FIG. 1 is an apparatus for supporting a staff member who delivers baggage to an individual at a destination. As illustrated in FIG. 1, the delivery support apparatus 10 includes an individual detection unit 11, an information specifying unit 12, and a notification unit 13.

The individual detection unit 11 detects a registered individual based on an image transmitted from a camera. The information specifying unit 12 specifies a destination of the individual, a schedule at the destination, and package to be received at the destination, for the individual detected by the individual detecting unit 11. The notification unit 13 notifies a terminal device at the destination at the destination that the specified baggage will be received by the individual according to the specified schedule.

In this manner, when the delivery support apparatus 10 detects an individual by the image from the camera, the delivery support apparatus 10 notifies the staff in charge of delivering that the relevant individual will soon receive the baggage, that is, the timing of unloading, The staff member can carry out unloading at an appropriate time.

Figure 2:
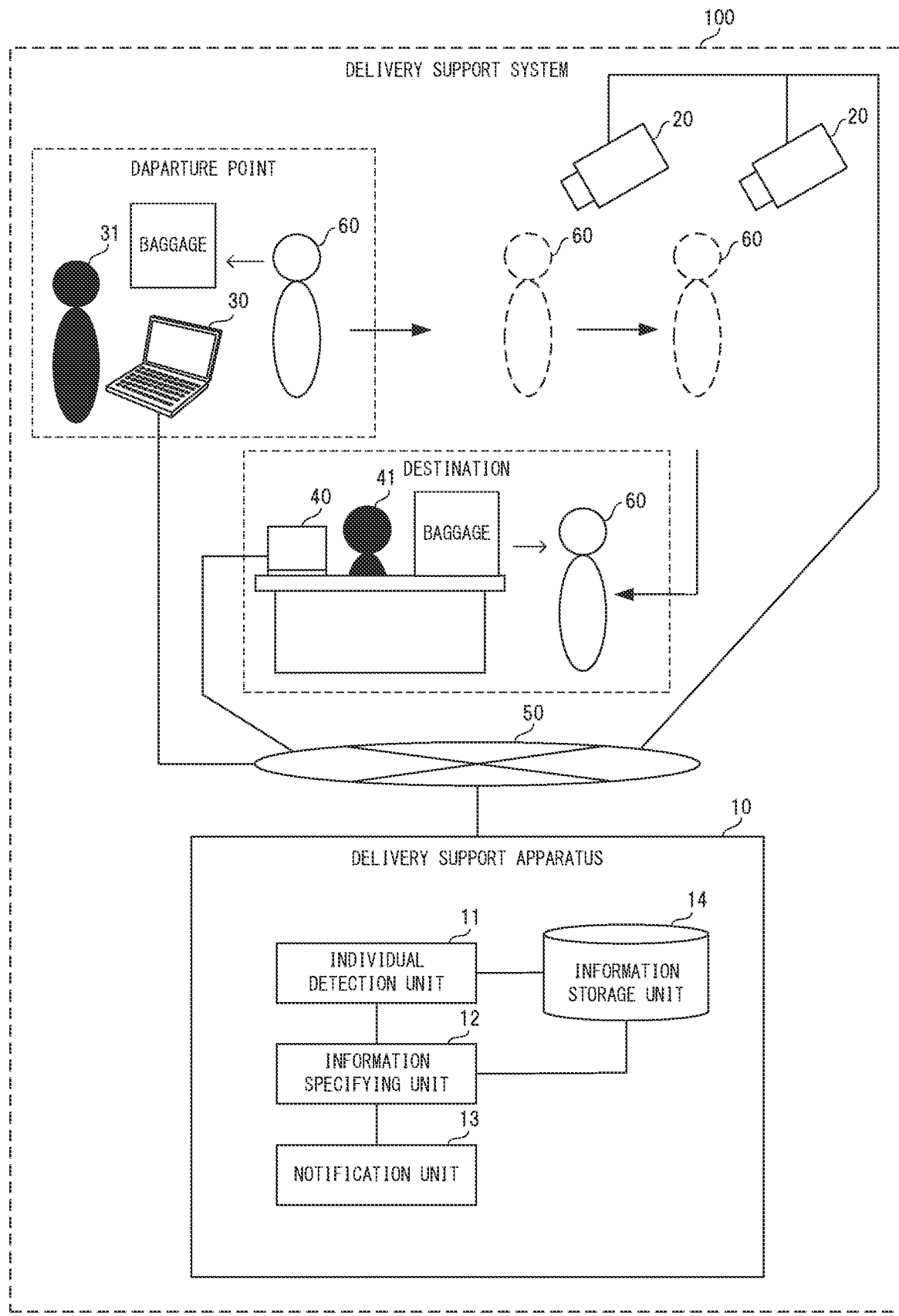
FIG. 2 is a block diagram specifically illustrating the configuration of the delivery support apparatus according to the first example embodiment.

Subsequently, the configuration and function of the delivery support apparatus 10 according to the first example embodiment will be described more specifically using FIG. 2. FIG. 2 is a block diagram specifically illustrating the configuration of the delivery support apparatus according to the first example embodiment.

As illustrated in FIG. 2, the delivery support apparatus 10 constitutes a delivery support system 100. As illustrated in FIG. 2, the delivery support system 100 is provided with, in addition to the delivery support apparatus 10, a plurality of cameras 20, a terminal device 30 used by an acceptance staff member 31 for accepting baggage, and a terminal device 40 used by delivery staff member 41 for delivering baggage. The delivery support apparatus 10 is connected to the camera 20, the terminal device 30, and the terminal device 40 via the network 50.

FIG. 2 shows the case that the individual 60 who deposits and receives the baggage is a traveler. Further FIG. 2 shows the case that the individual 60 deposits the baggage at the hotel, which is the departure point, and the individual 60 receives the deposited baggage at the airport, the station, the port, or the bus terminal, which is the destination. In these case, the schedule at the destination includes the departure time of the vehicle which the individual 60 uses.

Further, in the example of FIG. 2, it is assumed that a unique ID (identifier) is set in advance for the individual 60. The ID is associated with personal identification information for use in identifying the individual 60 and action information regarding action of the individual. As the personal identification information, biological information that can be acquired from the image taken by the camera 20 can be used. Specifically, as the biological information, feature value that quantitatively expresses features of the face, fingerprint, iris, retina, and vein can be used. In addition, as the personal identification information, personal clothes, gaits, etc. can be used too. The action information includes a departure point, a destination, a schedule at the destination, and the like.

Further, as illustrated in FIG. 2, in the example embodiment, the delivery support apparatus 10 includes an information storage unit 14 in addition to the individual detection unit 11, the information specifying unit 12, and the notification unit 13 described above. The information storage unit 14 stores the above-mentioned personal identification information and action information for each individual, that is, for each ID. Specifically, in the first example embodiment, the information storage unit 14 stores face feature value of each individual 60 as personal identification information. Hereinafter, it will be described as assuming that the individual is identified by using a face image as the personal identification information.

In the first example embodiment, the individual detection unit 11 detects the individual by using a face image as the personal identification information. Specifically, the individual detection unit 11 executes face recognition using a personal face image extracted from an image taken by the camera 20.

For example, when the individual 60 wishes to deposit the baggage, the acceptance staff member 31 photographs the face of the individual 60 using a camera attached to the terminal device 30. As a result, the terminal device 30 calculates feature value of the face for identifying the individual 60 from the captured image data of the face. Next, the terminal device 30 transmits the calculated feature value of the face to the delivery support apparatus 10 and requests a face authentication of the individual 60. As the feature value of the face, for example, feature value extracted from an important part of the face can be used. Further, it is also possible to perform face recognition using image data of important parts (eyes, nose, mouth, etc.) of the face instead of the feature value of the face.

When the individual detection unit 11 of the delivery support apparatus 10 receives the request for the face authentication, the individual detection unit 11 collates the transmitted feature value of the face with the biometric information stored in the information storage unit 14, that is, the feature value of face (hereinafter to as "registered feature value"). As a result of the collation, when an ID associated with the matching registered feature value exists, the individual detection unit 11 notifies the authentication permission and the ID associated with the registered feature value. On the other hand, when an ID associated with the matching registered feature value does not exist, the individual detection unit 11 notifies the disapproval of the authentication to the terminal device 30.

If the authentication is permitted, the terminal device 30 issues an identification number for the deposited baggage and transmits the issued identification number and the notified ID to the delivery support apparatus 10. In this case, the individual detection unit 11 stores the transmitted identification number in the information storage unit 14 as a part of the action information corresponding to the transmitted ID. Further, the terminal device 30 may generate a barcode or the like corresponding to the identification number and give it to the individual 60 who has deposited the baggage as a voucher. In addition, the acceptance staff member 31 may incorporate alphanumerical characters indicating whether or not the baggage contains duty-free goods in the identification number issued here based on the declaration of the individual 60.

The individual detection unit 11 performs the same face authentication with the terminal device 40. That is, when the individual 60 wishes to deliver the baggage, the delivery staff member 41 photographs the face of the individual 60 using a camera attached to the terminal device 40. Then, the terminal device 40 calculates the feature value of the face from the captured image data of the face and transmits it to the delivery support apparatus 10 in the same manner as the terminal device 30 described above. In this case as well, the individual detection unit 11 performs the face authentication as described above, and notifies the authentication permission and ID, or the disapproval of the authentication.

Further, in the first example embodiment, there are a plurality of cameras 20 and they are installed in different places. The position information for specifying the position of each camera 20 is stored in advance in the information storage unit 14 with the identifier for each camera. Each camera 20 transmits the image data of the face to the delivery support apparatus 10, and also transmits its own identifier. In addition, each camera 20 also assigns a transmission time of the image data of the face. Further, each camera 20 may extract feature value from the image data of the face and transmit the feature value to the delivery support apparatus 10.

When the face image data and the identifier are transmitted from the camera 20 via the network 50, the individual detection unit 11 specifies the feature value of the individual photographed by the camera 20 from the transmitted personal identification information. Then, the individual detection unit 11 collates the specified feature value (hereinafter referred to as "received feature value") with the registered feature value stored in the information storage unit 14 for each ID. And the individual detection unit 11 determined whether or not there is an ID whose the registered feature value matches the received feature value exists. Specifically, when a degree of matching between the registered feature value and the received feature value is equal to or higher than the set value, the individual detection unit 11 determines that they "match". Further, when there is a plurality of IDs whose the degree of matching is equal to or higher than the set value, the individual detection unit 11 selects the ID having the degree of matching is the most highest.

In the first example embodiment, when there is an ID determined to match by the individual detection unit 11, the information specifying unit 12 acquires the action information associated with this ID from the information storage unit 14. Then, the information specifying unit 12 specifies the departure place, the destination, the schedule at the destination, and the identifier of the baggage for the individual 60 for which this ID is set, based on the acquired action information.

Further, the information specifying unit 12 refers to the information storage unit 14, designates a camera 20 installed at or near the specified destination, and notifies the individual detection unit 11 and the notification unit 13. At this time, it is preferable that the information specifying unit 12 designates a camera arranged on a route where the individual arriving at the airport or the like goes to pick up the baggage. It is more preferable that the information specifying unit 12 considers moving speed of the individual and time required for the delivery staff member 41 to prepare for delivery, and designates a camera arranged on a place (hereinafter referred to "Checkpoint") on the route where the individual arriving at the airport or the like goes to pick up the baggage.

In the first example embodiment, the notification unit 13 is activated when the individual detection unit 11 detects an individual associated with an ID matching the registered feature value from the transmitted image. In this case, the notification unit 13 notifies the terminal device 40 at the destination 40 of this individual that the individual 60 with the corresponding ID specified by the information specifying unit 12 will receive the baggage.

Specifically, the notification unit 13 first accesses the information storage unit 14, acquires the identifier of the camera 20 that has transmitted the image, and determines whether or not the camera 20 is a pre-designated camera. Then, when the camera 20 that has transmitted the personal identification information is the designated camera, the notification unit 13 transmits the identifier of the baggage, the schedule, and ID of the individual 60 specified by the information specifying unit 12 to the terminal device 40 of the delivery staff member 41.

According to this aspect, when the individual 60 who receives the baggage passes the camera 20 to be the checkpoint, the notification unit 13 can notify the delivery staff member 41 that the delivery preparation should be prepared. An administrator or the like of the delivery support system 100 considers speed of movement of the individual and time required for the delivery staff member 41 to prepare for delivery and sets checkpoints between the departure point and the destination. The administrator or the like of the delivery assistance system 100 designates the camera 20 from cameras at the set checkpoints.

Further, the notification unit 13 accesses the information storage unit and acquires the position information based on the identifier of the camera 20 that has transmitted the personal identification information. And then the notification unit 13 can also compare the position of the camera 20 specified by the acquired position information and the position of the destination specified by the information specifying unit 12. In this case, the notification unit 13 determines, for example, whether or not the position of the camera 20 is in an area set with the destination as a reference.

Then, as a result of the determination, when the position of the camera 20 in in the area set with the destination as a reference, the notification unit 13 can also transmit the identifier of the baggage, the schedule, and individual specified by the information specifying unit 12. The ID of 60 can also be transmitted to the terminal device 40 of the delivery staff member 41. In this aspect, it is not necessary to specify the camera 20 as the checkpoint in advance. In addition, the notification unit 13 can further notify comments set according to the type of baggage to be received at the destination. Specifically, if the baggage does not include duty-free goods, the notification unit 13 notifies a comment that the baggage will be sent to the check-in counter after delivery, in addition to the notification of receipt of the baggage. Further, the notification unit 13 can determine whether or not the baggage is a duty-free goods, for example, by incorporating an alphanumerical character indicating whether or not the baggage is a duty-free goods in the baggage identification number issued by the terminal device 30 when receiving the baggage. It becomes. The additional comment by the notification unit 13 is not limited to "sending the baggage to the check-in counter after delivery" for the baggage that does not include the duty-free goods. An arbitrary comment corresponding to type of baggage is set as the additional comment.

Further, the notification unit 13 can obtains a difference between the current time and the departure time specified by the information specifying unit 12. When the obtained difference is equal to or less than the threshold value, the notification unit 13 can notify the terminal device 40 at the destination that the individual 60 will receive the baggage. This aspect can accommodate the case where the individual 60 to receive the baggage is near the destination but does not come to pick up the baggage immediately due to time before departure.

[Apparatus Operations]

Next, the operation of the delivery support apparatus 10 according to the first example embodiment will be described with reference to FIGS. 3 and 4. In the following description, FIG. 1 will be referred to as appropriate. Further, in the first example embodiment, the delivery support method is implemented by operating the delivery support apparatus 10. Therefore, the following description of the operation of the delivery support apparatus 10 applies to the delivery support method according to the first example embodiment.

First, the operation at the baggage deposit will be described with reference to FIG. 3. FIG. 3 is a flowchart illustrating the operation of the delivery support apparatus according to the first example embodiment at the baggage deposit. FIG. 3 illustrates the operation of the delivery support apparatus 10 when the terminal device 30 on the baggage deposit side requests a face authentication.

Figure 3:
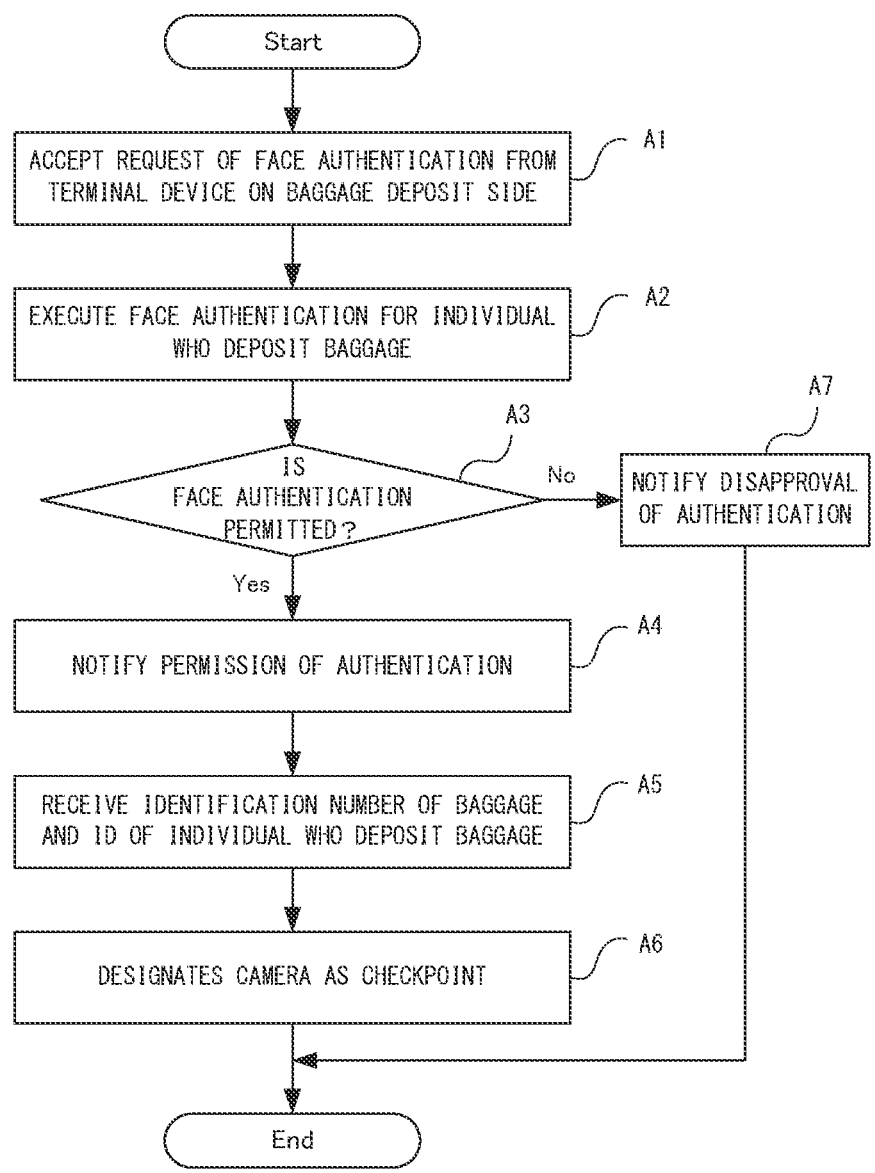
FIG. 3 is a flowchart illustrating the operation of the delivery support apparatus according to the first example embodiment at the baggage deposit.

As illustrated in FIG. 3, first, in the delivery support apparatus 10, when the terminal device 30 on the baggage deposit side transmits the personal identification information of the individual 60 and requests face authentication of the individual, the individual detection unit 11 accepts the request (step A1).

Next, the individual detection unit 11 executes face authentication using the personal identification information transmitted in step A1 (step A2). Specifically, the individual detection unit 11 collates the transmitted feature value of the face with the registered feature value stored in the information storage unit 14.

Next, the individual detection unit 11 determines whether or not to allow authentication based on the result of the collation (step A3). Specifically, the individual detection unit 11 determines whether or not an ID associated with the registered feature value that matches the transmitted feature value of the face exists. The individual detection unit 11 permit authentication if it exists and does not permit authentication if it does not exist.

When the authentication is not permitted as a result of the determination in step A3, the individual detection unit 11 notifies the terminal device 30 of the disapproval of the authentication (step A7) and ends the process. On the other hand, when the authentication is permitted as a result of the determination in step A3, the individual detection unit 11 notifies the terminal device 30 of the permission of the authentication (step A4).

When step A4 is executed, the terminal device 30 issues the identification number for the deposited baggage and transmits the issued identification number and the notified ID to the delivery support apparatus 10. Therefore, the individual detection unit 11 receives the transmitted identification number and ID (step A5). Further, the individual detection unit 11 stores the transmitted identification number in the information storage unit 14 as a part of the action information corresponding to the transmitted ID.

The information specifying unit 12 refers to the information storage unit 14, designates the camera 20 installed at or near the destination of the individual corresponding to the ID as the checkpoint, and notifies the individual detection unit 11 (Step A6).

Subsequently, the operation at the baggage delivery will be described with reference to FIG. 4. FIG. 4 is a flowchart illustrating the operation of the delivery support apparatus according to the first example embodiment at the baggage delivery. FIG. 4 illustrates the operation of the delivery support apparatus 10 when an image is received from the camera 20.

Figure 4:
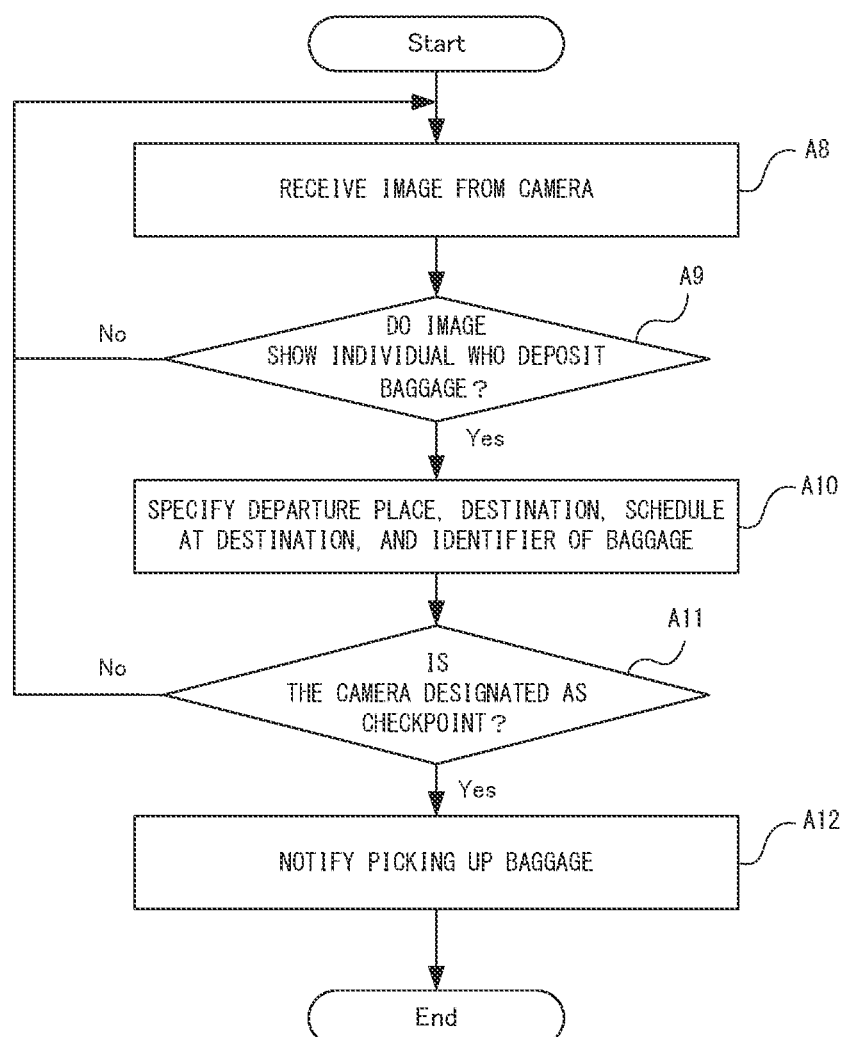
FIG. 4 is a flowchart illustrating the operation of the delivery support apparatus according to the first example embodiment at the baggage delivery.

As illustrated in FIG. 4, first, the individual detection unit 11 waits for the transmission of the image from each camera 20. When the image is transmitted from any of the cameras 20, the individual detection unit 11 receives the transmitted image. (Step A8).

Then, the individual detection unit 11 uses the image received in step A8 to determine whether or not the image from the camera 20 shows the individual who has deposited the baggage (step A9). Specifically, the individual detection unit 11 first identifies the feature value (received feature value) of the face of the individual from the face image of the individual involved in the image received in step A6. And the individual detection unit 11 collates the received feature value with the registered feature value, and determines whether or not there is an ID whose registered feature value matches the received feature value.

As a result of the determination in step A9, if the image from the camera 20 does not show the individual who deposited the baggage, the individual detection unit 11 enters the standby state and executes step A8 again.

On the other hand, as a result of the determination in step A9, if the image from the camera 20 shows the individual who has deposited the baggage, the individual detection unit 11 notifies the information specifying unit 12 of the ID of the individual being shown. As a result, the information specifying unit 12 acquires the action information associated with this ID. And, the information specifying unit 12 specifies the departure place, the destination, the schedule at the destination, and the identifier of the baggage for the individual 60 for which this ID is set, based on the acquired action information (step A10).

Next, the notification unit 13 determines whether or not the camera that has photographed the individual 60 who deposited the baggage is the camera designated as the checkpoint (step A11). Specifically, the notification unit 13 first accesses the information storage unit, acquires the identifier of the camera 20 that has transmitted the personal identification information. And the notification unit 13 determines whether or not the camera 20 is a camera designated as the checkpoint.

As a result of the determination in step A11, if the camera that was photographing the individual 60 who deposited the baggage is not the camera designated as the checkpoint, the notification unit 13 causes the individual detection unit 11 to execute step A8 again.

On the other hand, as a result of the determination in step A11, if the camera that was photographing the individual 60 who deposited the baggage is the camera designated as the checkpoint, the notification unit 13 notifies the terminal device 40 specified in step B8 of the identifier of the baggage and that the individual 60 is coming to pick up the baggage (step A12).

Steps A8 to A12 will be repeatedly executed until notification is given for all the deposited baggage. Further, when the individual 60 visits the destination after the execution of step A12 and the terminal device 40 on the delivery side requests face authentication, the individual detection unit 11 executes the face authentication as in steps A1 and A2 described above. After that, if the face authentication is permitted, the individual 60 can receive the baggage. Instead of the face authentication, the delivery staff member may delivery the baggage on the condition that the individual 60 presents an identification card, a barcode-format exchange receipt, or the like.

Effect of First Example Embodiment

As described above, in first example embodiment 1, When the camera captures the individual who deposited the baggage past the checkpoint set between the departure point and the destination, The terminal device 40 at the destination is notified that this individual is coming to pick up the baggage. According to the first example embodiment, the delivery staff member who delivers the baggage can be notified of the unloading timing, so that the delivery staff member can unload at an appropriate timing.

[Program]

It suffices for a program in the first example embodiment to be a program that causes a computer to carry out steps A1 to A7 illustrated in FIG. 3 and steps A8 to A12 illustrated in FIG. 4.

Further, steps A1 to A7 illustrated in FIG. 3 and steps A8 to A12 illustrated in FIG. 4 may be executed by different computers respectively. Also, by this program being installed and executed in the computer, the delivery support apparatus 10 and the delivery support method according to the first example embodiment can be realized. In this case, a processor of the computer functions and performs processing as the individual detection unit 11, the information specifying unit 12, and the notification unit 13.

Also, the information storage unit 14 is realized by storing a data file constituting them into a storage device, such as a hard disk, included in the computer. Also, the information storage unit 14 may be realized by a storage devis of other computer.

Examples of computers include general-purpose PCs, smartphones, and tablet-type terminal devices. Further, the computer may be the terminal device 30 or the terminal device 40, in which case the delivery support apparatus 10 in the first example embodiment is built on the operating system of the terminal device 30 or the terminal device 40.

Further, the program according to the first example embodiment may be executed by a computer system constructed with a plurality of computers. In this case, for example, each computer may function as one of the individual detection unit 11, the information specifying unit 12, and the notification unit 13.

Further, in the first example embodiment, for example, the individual detection unit 11 may be realized by a computer provided in the camera 20. In this case, the information specifying unit 12 receives the ID from the camera 20 and specifies the destination corresponding to the ID, the schedule at the destination, and the baggage to be received at the destination.

Modification Example

Figure 5:
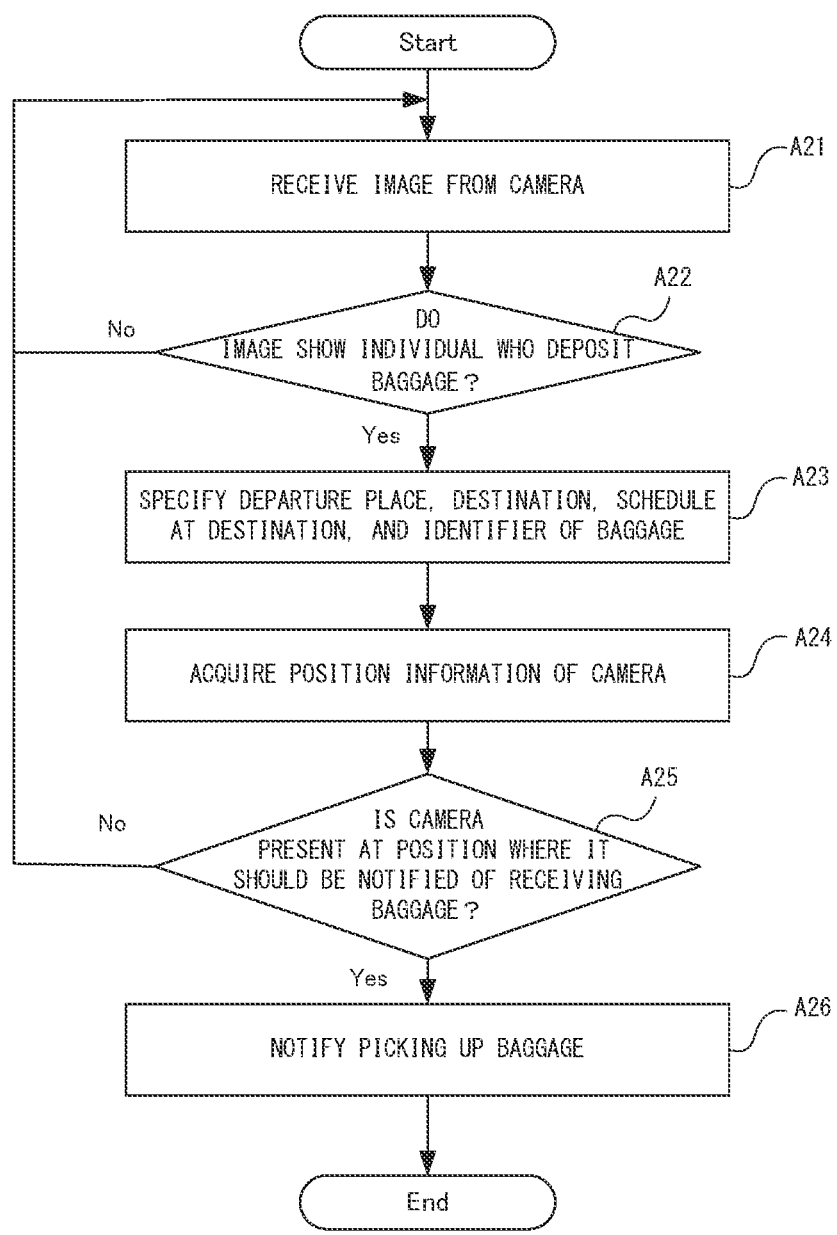
FIG. 5 is a flowchart illustrating a modified example of the operation of the delivery support apparatus according to the first example embodiment at the baggage delivery.

In the above-described first example embodiment, it is assumed that a camera to be the checkpoint is specified in advance. But, each time the delivery support apparatus 10 receives the personal identification information from the camera 20, it may be determined whether or not to notify the terminal device 40 at the destination. The modification example in the first example embodiment will be described with reference to FIG. 5. FIG. 5 is a flowchart illustrating a modified example of the operation of the delivery support apparatus according to the first example embodiment at the baggage delivery.

First, in this modification example, the delivery support apparatus 10 executes steps A1 to A5 and A7 illustrated in FIG. 3 as an operation at the baggage deposit. In this modification example, step A6 is not executed, and the camera 20 as a checkpoint is not specified.

As illustrated in FIG. 5, the individual detection unit 11 waits for the transmission of an image from each camera 20. When the image is transmitted from any of the cameras 20, the individual detection unit 11 receives the transmitted image (step A21). Step A21 is the same step as step A8 illustrated in FIG. 4.

Next, the individual detection unit 11 uses the image received in step A8 to determine whether or not the image from the camera 20 shows the individual who has deposited the baggage (step A22).

As a result of the determination in step A22, if the image from the camera 20 does not show the individual who deposited the baggage, the individual detection unit 11 enters the standby state and executes step A21 again.

On the other hand, as a result of the determination in step A22, if the image from the camera 20 shows the individual who has deposited the baggage, the individual detection unit 11 notifies the information specifying unit 12 of the ID of the individual being shown. As a result, the information specifying unit 12 acquires the action information associated with this ID. And the information specifying unit 12 specifies the departure place, the destination, the schedule at the destination, and the identifier of the baggage for the individual 60 for which this ID is set, based on the acquired action information (step A23).

Next, the notification unit 13 accesses the information storage unit 14 and acquires the position information based on the identifier of the camera 20 that has transmitted the image (step A24).

Next, the notification unit 13 compares the position of the camera 20 specified by the position information acquired in step A24 with the position of the destination specified in step A23. Then, the notification unit 13 determines whether or not the camera 20 is present at a position where it should be notified that the relevant individual 60 has received the baggage (step A25).

By step A25, it is determined whether or not the camera 20 exists in the area set based on the destination (for example, the area near the airport) or on the route between the entrance of the airport and the delivery window. Therefore, according to this modification example, more precise notification can be realized.

If, as a result of the determination in step A25, the camera 20 is not present at a position where it should be notified that the relevant individual 60 has received the baggage, step A21 is executed again.

On the other hand, if, as a result of the determination in step A25, the camera 20 is present at a position where it should be notified that the relevant individual 60 has received the baggage, the notification unit 13 notifies the terminal device 40 of the delivery staff member 41 of the identifier of the baggage, the schedule, and the ID of the individual 60 identified by the information specifying unit 12 (step A26).

According to the modification example as described above, it is not necessary to signify the camera 20 as the checkpoint in advance, and there is an advantage that it can be suitably applied when there are a large number of cameras 20 as the checkpoints.

Second Example Embodiment 2

Next, a delivery support apparatus, a delivery support method, and a program according to the second example embodiment will be described with reference to FIGS. 6 to 8.

[Apparatus Configuration]

First, a configuration of the delivery support apparatus according to the second example embodiment will be described with reference to FIG. 6. FIG. 6 is a block diagram illustrating the configuration of the delivery support apparatus according to the second example embodiment.

Figure 6:
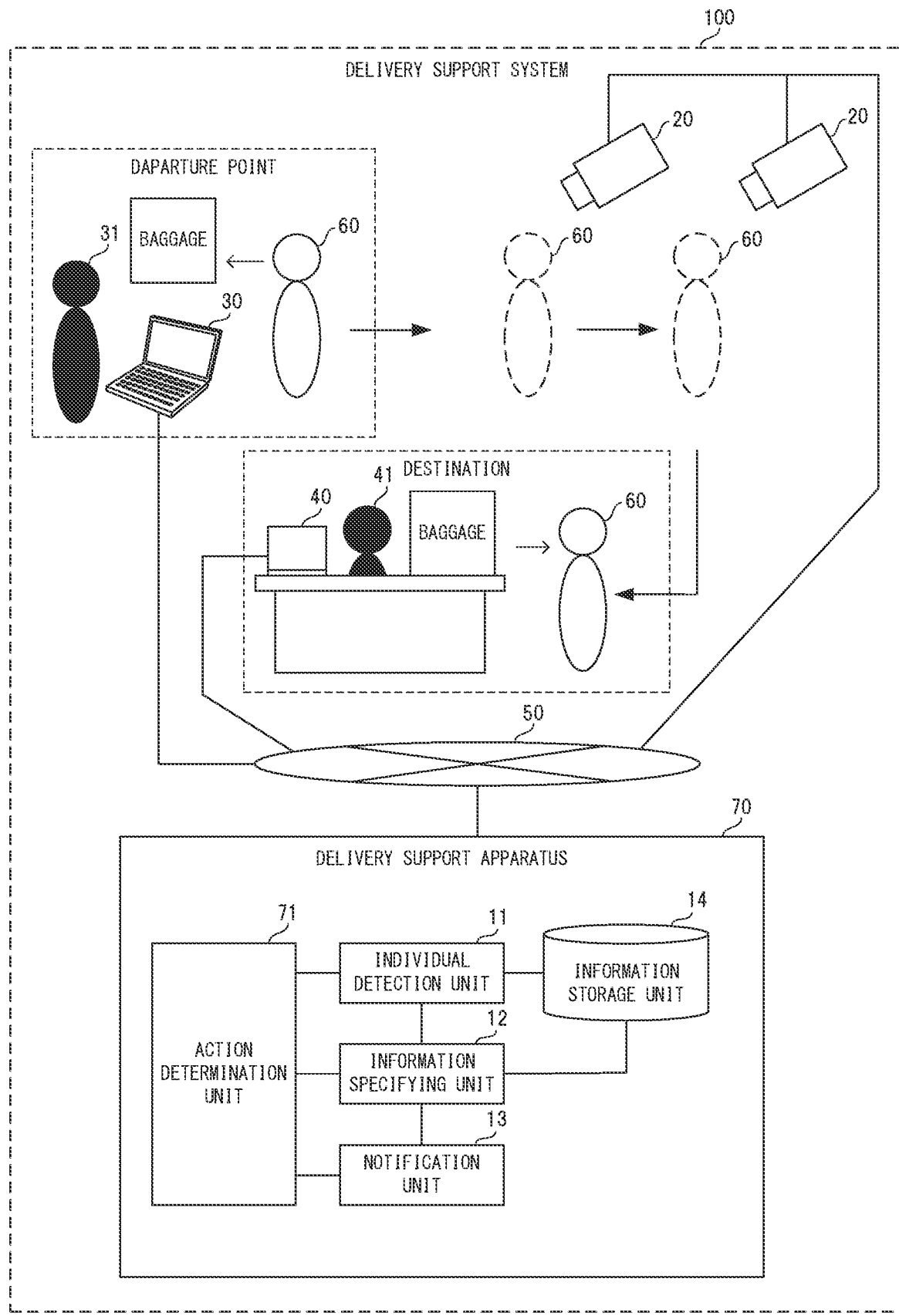
FIG. 6 is a block diagram illustrating the configuration of the delivery support apparatus according to the second example embodiment.

As illustrated in FIG. 6, the delivery support apparatus 70 according to the second example embodiment constitutes the delivery support system 100 as in the first example embodiment. The delivery support apparatus 70 also is connected to the plurality of cameras 20, the terminal device 30 of the acceptance staff member 31 for accepting the baggage, and the terminal device 40 used by the delivery staff member 41 for delivering the baggage via the network 50.

Further, as illustrated in FIG. 4, the delivery support apparatus 70 also includes the individual detection unit 11, the information specifying unit 12, the notification unit 13, and the information storage unit 14, similarly to the delivery support apparatus 10 according to the first example embodiment. However, the delivery support apparatus 70 also includes an action determination unit 71 in addition to these and is different from the delivery support apparatus 10 according to the first example embodiment in this respect. Hereinafter, the differences from the first example embodiment will be mainly described.

The action determination unit 71 is activated when the individual detection unit 11 that has received images from each of the plurality of cameras 20 detects the individual 60 (ID) from the images transmitted from all or some of the cameras 20 among the plurality of cameras 20. Then, the action determination unit 71 determines whether or not the individual 60 is heading to the destination based on a position of the camera of the source of the personal identification information detecting the individual, the transmission time, and the schedule specified by the information specifying unit 12.

Specifically, the action determination unit 71 accumulates the position of the camera of the source and the transmission time each time the ID is detected by the individual detection unit 11, and specifies the movement locus of the individual 60 who has this ID. If distance between the individual 60 and the destination is decreasing at a rate equal to or higher than a certain rate, and difference between the current time and the departure time is equal to or less than the threshold, the action determination unit 71 determines that the individual 60 is heading to the destination.

When the action determination unit 71 determines that the individual is heading to the destination, the notification unit 13 notifies the terminal device at the destination 40 that the specified individual by the information specifying unit 12 will receive the baggage.

[Apparatus Operation]

Next, the operation of the delivery support apparatus 70 according to the second example embodiment will be described with reference to FIGS. 7 and 8. In the following description, FIG. 6 will be referred to as appropriate. Further, in the second example embodiment, the delivery support method is implemented by operating the delivery support apparatus 70. Therefore, the following description of the operation of the delivery support apparatus 70 applies to the delivery support method according to the second example embodiment.

First, the operation at the baggage deposit will be described with reference to FIG. 7. FIG. 7 is a flowchart illustrating the operation of the delivery support apparatus according to the second example embodiment at the baggage deposit. FIG. 7 shows the operation of the delivery support apparatus 70 when the terminal device 30 on the baggage deposit side requests a face authentication.

Figure 7:
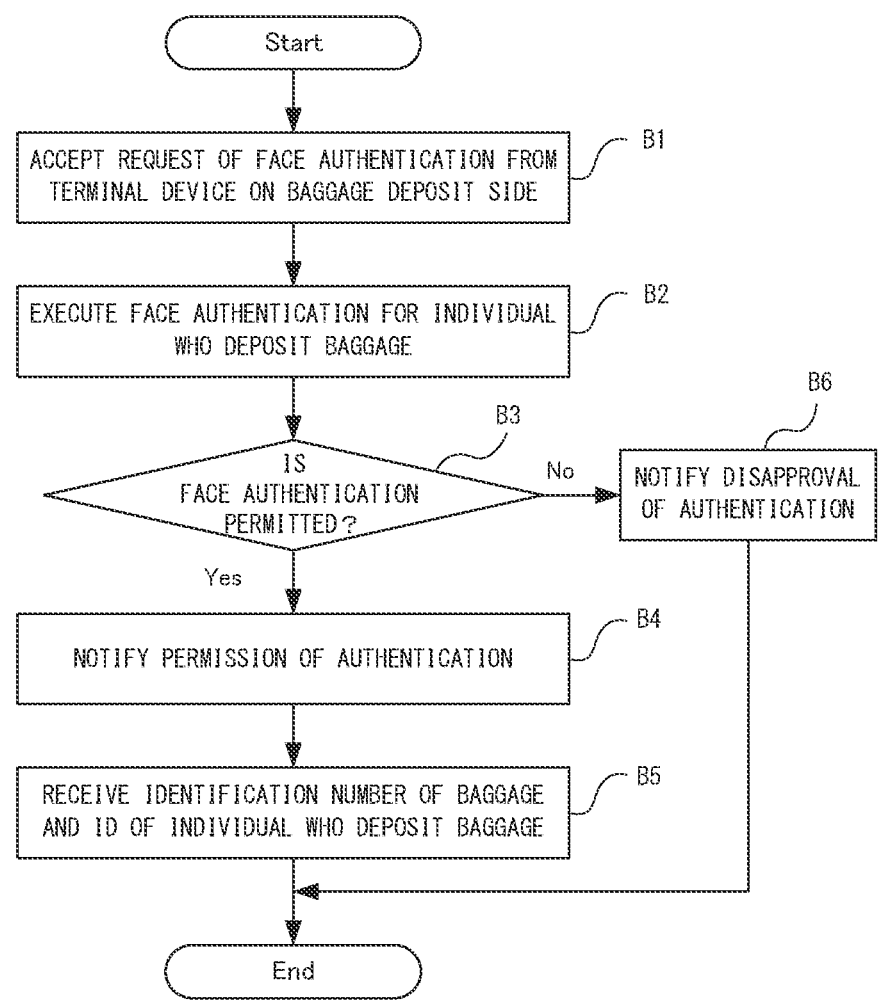
FIG. 7 is a flowchart illustrating the operation of the delivery support apparatus according to the second example embodiment at the baggage deposit.

As illustrated in FIG. 7, first, in the delivery support apparatus 70, when the terminal device 30 on the baggage deposit side transmits the personal identification information of the individual 60 and requests face authentication of the individual, the individual detection unit 11 accepts the request (step B1).

Next, the individual detection unit 11 executes face authentication using the image transmitted in step B1 (step B2).

Next, the individual detection unit 11 determines whether or not to allow authentication based on the result of the collation (step B3).

When the authentication is not permitted as a result of the determination in step B3, the individual detection unit 11 notifies the terminal device 30 of the disapproval of the authentication (step B6) and ends the process. On the other hand, when the authentication is permitted as a result of the determination in step B3, the individual detection unit 11 notifies the terminal device 30 of the permission of the authentication (step B4).

When step B4 is executed, the terminal device 30 issues the identification number for the deposited baggage and transmits the issued identification number and the notified ID to the delivery support apparatus 10. Therefore, the individual detection unit 11 receives the transmitted identification number and ID (step B5). Further, the individual detection unit 11 stores the transmitted identification number in the information storage unit 14 as a part of the action information corresponding to the transmitted ID.

The above-mentioned steps B1 to B6 are the same steps as steps A1 to A5 and A7 illustrated in FIG. 3 in the example embodiment.

Subsequently, the operation at the baggage delivery will be described with reference to FIG. 8. FIG. 8 is a flow chart illustrating the operation of the delivery support apparatus according to the second example embodiment at the baggage delivery.

Figure 8:
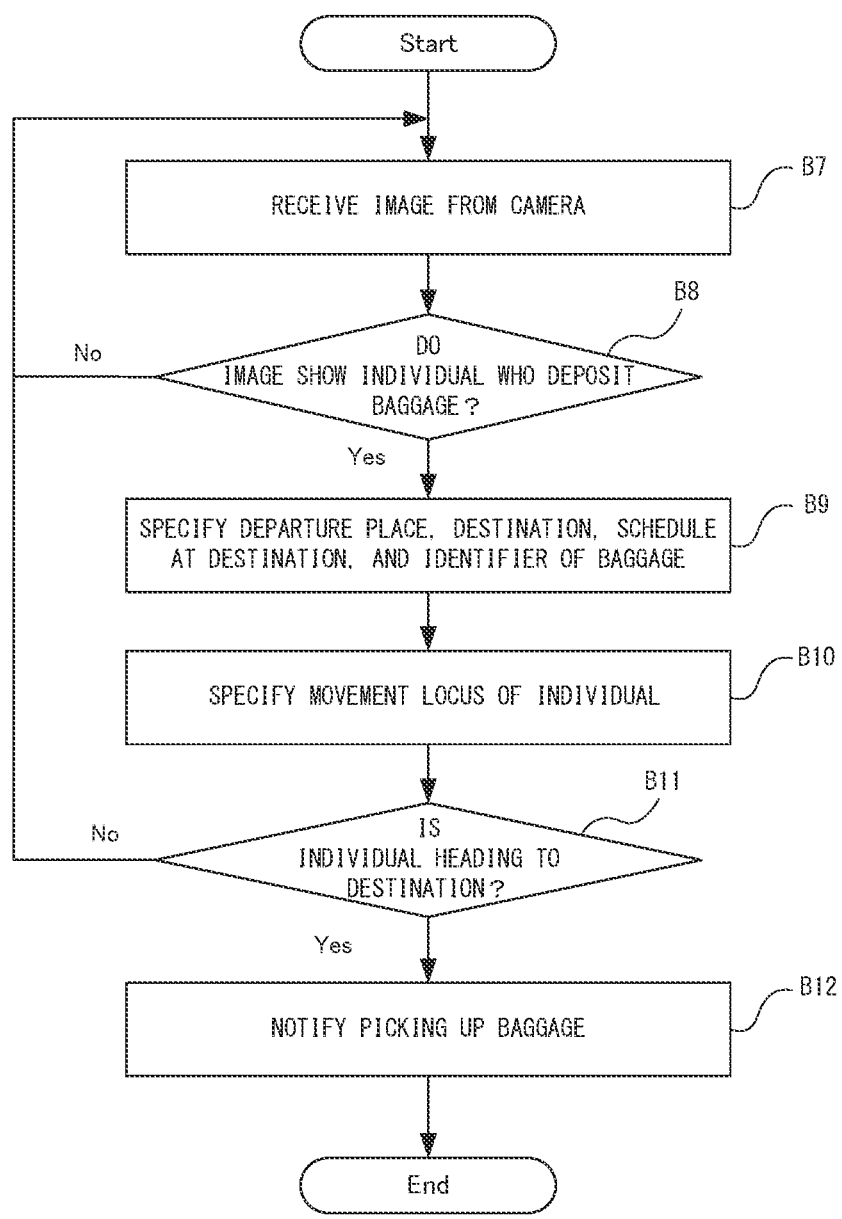
FIG. 8 is a flow chart illustrating the operation of the delivery support apparatus according to the second example embodiment at the baggage delivery.

As illustrated in FIG. 8, first, the individual detection unit 11 waits for the transmission of personal identification information from each camera 20. When an image is transmitted from any of the cameras 20, the individual detection unit 11 receives the transmitted image (step B7).

Then, the individual detection unit 11 determines whether or not the image f received in step B7 shows the individual who has deposited the baggage (step B8).

As a result of the determination in step B8, if the image from the camera 20 does not show the individual who deposited the baggage, the individual detection unit 11 enters the standby state and executes step B7 again On the other hand, as a result of the determination in step B8, if the image from the camera 20 shows the individual who has deposited the baggage, the individual detection unit 11 notifies the information specifying unit 12 of the ID of the individual being shown. As a result, the information specifying unit 12 acquires the action information associated with this ID. And, the information specifying unit 12 specifies the departure place, the destination, the schedule at the destination, and the identifier of the baggage for the individual 60 for which this ID is set, based on the acquired action information (step B9).

Next, the action determination unit 71 specifies the position and transmission time of the camera 20 which sent the personal identification information, for the individual 60 determined to be reflected in the camera in step B8. Then, the action determination unit 71 specifies the movement locus of the individual 60 based on the position and the transmission time of the camera 20 which sent the personal identification information (step B10).

Specifically, the action determination unit 71 can specify the position of the camera 20 by searching the position information stored in the information storage unit 14 based on the identifier of the camera 20 transmitted from the camera 20. In addition, the action determination unit 71 specifies the transmission time base on the personal identification information. By specifying two or more combinations of the transmission time and the camera 20, it is possible to specify the movement locus of the individual 60.

Next, the action determination unit 71 compares the specified movement locus with the destination and determines whether or not the individual 60 is heading to the destination (step B11). Specifically, if distance between the individual 60 and the destination is decreasing at a rate equal to or higher than a certain rate, and difference between the current time and the departure time is equal to or less than the threshold, the action determination unit 71 determines that the individual 60 is heading to the destination.

If the action determination unit 71 determines that the individual 60 is not heading to the destination as a result of the determination in step B11, the action determination unit 71 causes the individual detection unit 11 to execute step B7 again. On the other hand, If the action determination unit 71 determines that the individual 60 is heading to the destination as a result of the determination in step B11, the action determination unit 71 causes the notification unit 13 to execute step B12.

In step B12, the notification unit 13 notifies the terminal device 40 specified in step B8 of the identifier of the baggage and that the individual 60 is coming to pick up the baggage.

Steps B7 to B12 will be repeatedly executed until notification is given for all the deposited baggage. Further, when the individual 60 visits the destination after the execution of step B12 and the terminal device 40 on the delivery side requests face authentication, the individual detection unit 11 executes the face authentication as in steps B1 and B2 described above. After that, if the face authentication is permitted, the individual 60 can receive the baggage. Also in the second example embodiment, instead of the face authentication, the delivery staff member may delivery the baggage on the condition that the individual 60 presents an identification card, a barcode-format exchange receipt, or the like.

Effect of the Second Example Embodiment

As described above, in the second example embodiment, when it is determined that the individual who has deposited the baggage is approaching the destination, the terminal device at the destination 40 at the destination is notified of the receipt of the baggage by the individual. Also, in the second example embodiment, as in the first example embodiment, the delivery staff member who delivers the baggage can be notified of the unloading timing, so that the delivery staff member can unload at an appropriate timing.

[Program]

It suffices for a program in the second example embodiment to be a program that causes a computer to carry out steps B1 to B6 illustrated in FIG. 7 and steps B7 to B12 illustrated in FIG. 8. Further, steps B1 to B6 illustrated in FIG. 7 and steps B7 to B12 illustrated in FIG. 8 may be executed by different computers respectively. Also, by this program being installed and executed in the computer, the delivery support apparatus 10 and the delivery support method according to the second example embodiment can be realized. In this case, a processor of the computer functions and performs processing as the individual detection unit 11, the information specifying unit 12, the notification unit 13, and the action determination unit 71.

Also, in the second example embodiment, the information storage unit 14 is realized by storing a data file constituting them into a storage device, such as a hard disk, included in the computer. Also, the information storage unit 14 may be realized by a storage devis of other computer.

Examples of computers include general-purpose PCs, smartphones, and tablet-type terminal devices. Further, the computer may be the terminal device 30 or the terminal device 40, in which case the delivery support apparatus 10 in the first example embodiment is built on the operating system of the terminal device 30 or the terminal device 40.

Further, the program according to the second example embodiment may be executed by a computer system constructed with a plurality of computers as in the first example embodiment. In this case, for example, each computer may function as one of the individual detection unit 11, the information specifying unit 12, the notification unit 13, and the action determination unit 71. Further, in the second example embodiment, for example, the individual detection unit 11 may be realized by a computer provided in the camera 20. In this case, the information specifying unit 12 receives the ID from the camera 20 and specifies the destination corresponding to the ID, the schedule at the destination, and the baggage to be received at the destination.

Further, the examples of the above-described first and second example embodiments are explained with an example of using a face image as the personal identification information. However, in the first and second example embodiments, an individual's clothing, gait, etc. may be used as the individual identification information. For example, with respect to personal clothes, the clothes of the individual 60 on the day acquired by the terminal device 30 of the acceptance staff member may be used as the personal identification information. Fingerprints, irises, retinas, veins, etc. can be used as biometric information. In these cases, it is necessary to install the camera 20 so that the biometric information can be easily acquired. For example, in the case of fingerprints, veins, etc., the camera 20 is installed on a handrail that exists on the way for the individual 60 to the destination.

[Physical Configuration]

Figure 9:
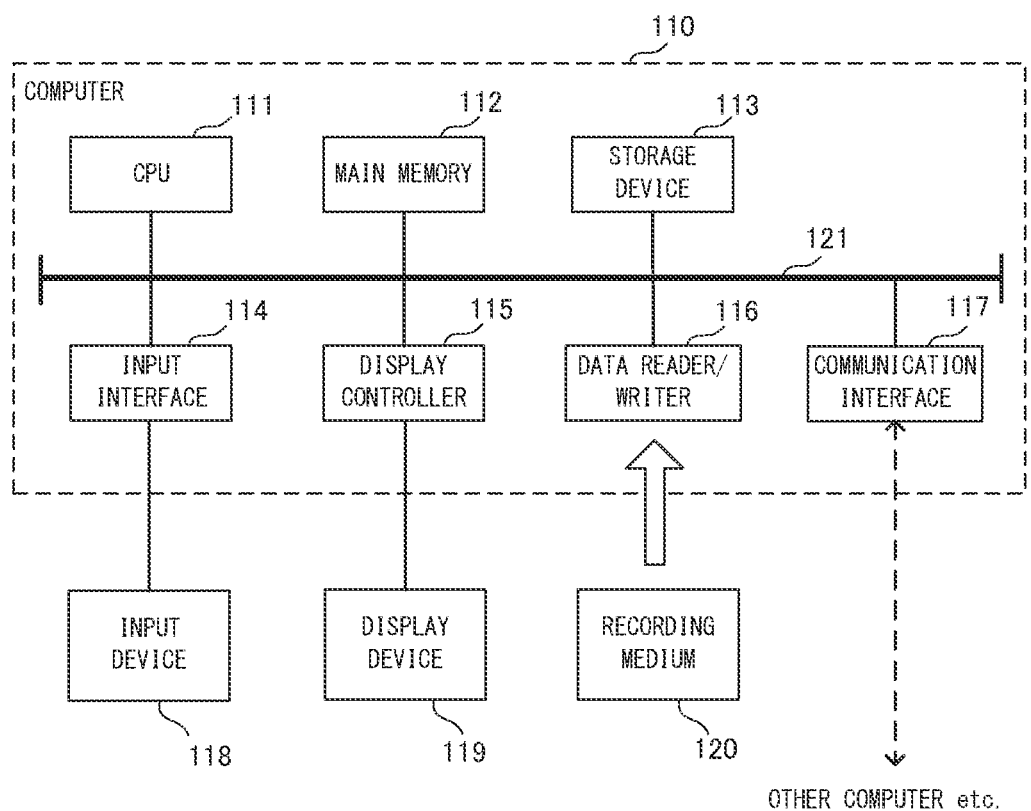
FIG. 9 is a block diagram illustrating an example of a computer that realizes the delivery support apparatus according to the first and second example embodiments.

Here, Using FIG. 9, a description is now given of a computer that realizes the delivery support apparatus 10 by executing the program according to the first and second example embodiment. FIG. 9 is a block diagram illustrating an example of a computer that realizes the delivery support apparatus according to the first and second example embodiments.

As illustrated in FIG. 9, a computer 110 includes a central processing unit (CPU) 111, a main memory 112, a storage device 113, an input interface 114, a display controller 115, a data reader/writer 116, and a communication interface 117. These components are connected via a bus 121 so as to be capable of performing data communication with one another.

Further, the computer 110 may include a graphics processing unit (GPU) or a field-programmable gate array (FPGA) in addition to the CPU 111 or in place of the CPU 111. In this aspect, the GPU or FPGA can execute the program according to the example embodiment.

The CPU 111 loads the program (codes) in the example embodiment, which is stored in the storage device 113, onto the main memory 112, and performs various computations by executing these codes in a predetermined order. The main memory 112 is typically a volatile storage device such as a dynamic random-access memory (DRAM).

Furthermore, the program in the example embodiment is provided in a state such that the program is stored in a computer readable recording medium 120. Note that the program in the example embodiment may also be a program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

Note that the delivery support apparatus 10 in the example embodiment can also be realized by using pieces of hardware corresponding to the respective units, rather than using a computer on which the program is installed. Furthermore, a part of the delivery support apparatus 10 may be realized by using the program, and the remaining part of the delivery support apparatus 10 may be realized by using hardware.

While a part of or the entirety of the above-described example embodiment can be expressed by (Supplementary note 1) to (Supplementary note 15) described in the following, the invention is not limited to the following description.

(Supplementary Note 1)

A delivery support apparatus, including:
an individual detection unit that detects a registered individual based on an image transmitted from a camera,
an information specifying unit that specifies a destination of the individual, a schedule at the destination, and a baggage to be received at the destination for the individual detected by the individual detection means,
a notification unit that notifies a terminal device at the destination that the specified baggage will be received by the individual according to the specified schedule.

(Supplementary Note 2)

The delivery support apparatus according to Supplementary note 1,
Wherein, in case that the individual detection unit have detected the registered individual based on the image transmitted from a predetermined camera among a plurality of cameras, the notification unit notifies the terminal device at the destination that the specified baggage will be received by the individual.

(Supplementary Note 3)

The delivery support apparatus according to Supplementary note 1, further including:
an action determination unit that determines, in case that the image is transmitted from the plurality of cameras and the individual detection unit have detected the individual based on an image transmitted from all or a part of the plurality of cameras, whether or not the individual is heading for the destination based on a position of the camera that is a source of the image from which the individual is detected, transmission time, and the specified schedule,
wherein the notification unit notifies the terminal device at the destination that the specified baggage will be received by the individual, in case that the action determination unit determines that the individual is heading for the destination.

(Supplementary Note 4)

The delivery support apparatus according to any one of Supplementary notes 1 to 3,
wherein the notification unit notifies preset comments according to a type of the baggage to be received at the destination.

(Supplementary Note 5)

The delivery support apparatus according to any one of claims 1 to 4,
wherein the destination in one of an airport, a station, a port, and a bus terminal, and the schedule includes a departure time when a vehicle used by the individual departs,
the notification unit calculates a difference between a current time and the departure time and notifies the terminal device at the destination that the specified baggage will be received by the individual, provided that the calculated difference is equal to or less than a threshold value.

(Supplementary Note 6)

A delivery support method, including:

an individual detection step of detecting a registered individual based on an image transmitted from a camera, an information specifying step of specifying a destination of the individual, a schedule at the destination, and a baggage to be received at the destination for the individual detected, a notification step of notifying a terminal device at the destination that the specified baggage will be received by the individual according to the specified schedule.

(Supplementary Note 7)

The delivery support method according to Supplementary note 6, wherein, in the notification step, in case that the registered individual is detected based on the image transmitted from a predetermined camera among a plurality of cameras, notifying the terminal device at the destination that the specified baggage will be received by the individual.

(Supplementary Note 8)

The delivery support method according to Supplementary note 6, further including:

an action determination step of determining, in case that the image is transmitted from the plurality of cameras and the individual has been detected based on an image transmitted from all or a part of the plurality of cameras, whether or not the individual is heading for the destination based on a position of the camera that is a source of the image from which the individual is detected, transmission time, and the specified schedule, wherein, in the action determination step, notifying the terminal device at the destination that the specified baggage will be received by the individual, in case that it is determined that the individual is heading for the destination.

(Supplementary Note 9)

The delivery support method according to any one of Supplementary notes 6 to 8, wherein, in the notification step, notifying preset comments according to a type of the baggage to be received at the destination.

(Supplementary Note 10)

The delivery support method according to any one of Supplementary notes 6 to 9, wherein the destination in one of an airports, a station, a port, and a bus terminal, and the schedule includes a departure time when a vehicle used by the individual departs, in the notification step, calculating a difference between a current time and the departure time and notifying the terminal device at the destination that the specified baggage will be received by the individual, provided that the calculated difference is equal to or less than a threshold value.

(Supplementary Note 11)

A computer-readable recording medium that includes a program, the program including instructions that cause a computer to carry out:

an individual detection step of detecting a registered individual based on an image transmitted from a camera, an information specifying step of specifying a destination of the individual, a schedule at the destination, and a baggage to be received at the destination for the individual detected, a notification step of notifying a terminal device at the destination that the specified baggage will be received by the individual according to the specified schedule.

(Supplementary Note 12)

The computer-readable recording medium according to Supplementary note 11, wherein, in the notification step, in case that the registered individual is detected based on the image transmitted from a predetermined camera among a plurality of cameras, notifying the terminal device at the destination that the specified baggage will be received by the individual.

(Supplementary Note 13)

The computer-readable recording medium according to Supplementary note 11, the program further including instruction that cause the computer to carry out:

an action determination step of determining, in case that the image is transmitted from the plurality of cameras and the individual has been detected based on an image transmitted from all or a part of the plurality of cameras, whether or not the individual is heading for the destination based on a position of the camera that is a source of the image from which the individual is detected, transmission time, and the specified schedule, wherein, in the action determination step, notifying the terminal device at the destination that the specified baggage will be received by the individual, in case that it is determined that the individual is heading for the destination.

(Supplementary Note 14)

The computer-readable recording medium according to any one of Supplementary notes 11 to 13, wherein, in the notification step, notifying preset comments according to a type of the baggage to be received at the destination.

(Supplementary Note 15)

The computer-readable recording medium according to any one of Supplementary notes 11 to 14, wherein the destination in one of an airport, a station, a port, and a bus terminal, and the schedule includes a departure time when a vehicle used by the individual departs, in the notification step, calculating a difference between a current time and the departure time and notifying the terminal device at the destination that the specified baggage will be received by the individual, provided that the calculated difference is equal to or less than a threshold value.

The invention has been described with reference to an example embodiment above, but the invention is not limited to the above-described example embodiment. Within the scope of the invention, various changes that could be understood by a person skilled in the art could be applied to the configurations and details of the invention.

INDUSTRIAL APPLICABILITY

As described above, according to the present invention, it is possible to notify the staff member in charge of delivering the baggage of the timing of unloading. The present invention is useful for a system that manages the deposition and delivery of baggage for tourists.

LIST OF REFERENCE SIGNS

10 Delivery support apparatus (first example embodiment)
11 Individual detection unit
12 Information specifying unit
13 Notification unit
14 Information storage unit
20 Camera
30 Terminal device of receiving staff member
31 Receiving staff member
40 Terminal device of delivery staff member
41 Delivery staff member
50 Network
70 Delivery support apparatus (second example embodiment)
71 Action determination unit
100 Delivery support system
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. A delivery support apparatus comprising:
at least one memory storing instructions; and
at least one processor configured to execute the instructions to:
detect a registered individual based on an image transmitted from a camera, by executing facial recognition using the image;
specify a destination of the individual, a schedule at the destination, and a baggage to be received at the destination for the individual detected;
notify a terminal device at the destination that the specified baggage will be received by the individual according to the specified schedule; and
when the registered individual is detected from the image transmitted from any one of a plurality of cameras, compare a position of the camera that has transmitted the image in which the individual has been detected with the specified the destination of the individual, and notify the terminal device at the destination that the specified baggage has been received by the detected individual in accordance with a result of the comparison.

2. The delivery support apparatus according to claim 1, wherein the at least one processor is configured to execute the instructions to:
when the registered individual is detected from the image transmitted from any one of a plurality of cameras, further determine whether or not the detected individual is heading for the destination based on the position of the camera, transmission time, and the specified schedule,
in case that the detected individual is heading for the destination, compare the position of the camera that has transmitted the image in which the individual has been detected with the specified the destination of the individual.

3. The delivery support apparatus according to claim 1, wherein the at least one processor is configured to execute the instructions to:
notify preset comments according to a type of the baggage to be received at the destination.

4. The delivery support apparatus according to claim 1, wherein the destination is in one of an airport, a station, a port, and a bus terminal, and the schedule includes a departure time when a vehicle used by the individual departs,
the at least one processor is configured to execute the instructions to:
calculate a difference between a current time and the departure time and notifies the terminal device at the destination that the specified baggage will be received by the individual, provided that the calculated difference is equal to or less than a threshold value.

5. A delivery support method performed by a computer and comprising:
detecting a registered individual based on an image transmitted from a camera, by executing facial recognition using the image;
specifying a destination of the individual, a schedule at the destination, and a baggage to be received at the destination for the individual detected;
notifying a terminal device at the destination that the specified baggage will be received by the individual according to the specified schedule; and
when the registered individual is detected from the image transmitted from any one of a plurality of cameras, comparing a position of the camera that has transmitted the image in which the individual has been detected with the specified the destination of the individual, and notifying the terminal device at the destination that the specified baggage has been received by the detected individual in accordance with a result of the comparison.

6. A non-transitory computer-readable recording medium storing a program including instructions that cause a computer to carry out:
detecting a registered individual based on an image transmitted from a camera, by executing facial recognition using the image;
specifying a destination of the individual, a schedule at the destination, and a baggage to be received at the destination for the individual detected;
notifying a terminal device at the destination that the specified baggage will be received by the individual according to the specified schedule;
when the registered individual is detected from the image transmitted from any one of a plurality of cameras, comparing a position of the camera that has transmitted the image in which the individual has been detected with the specified the destination of the individual, and notifying the terminal device at the destination that the specified baggage has been received by the detected individual in accordance with a result of the comparison.

* * * * *